Jan. 6, 1931.  T. E. JOHNSON  1,788,159

ANTISKID DEVICE

Filed April 8, 1929

INVENTOR
T. E. Johnson
BY
ATTORNEY

Patented Jan. 6, 1931

1,788,159

UNITED STATES PATENT OFFICE

THEODORE EMIL JOHNSON, OF UXBRIDGE, ONTARIO, CANADA

ANTISKID DEVICE

Application filed April 8, 1929. Serial No. 353,561.

This invention relates to improvements in anti-skid devices for motor vehicles, as described in the present specification and illustrated in the accompanying drawings which form part of same.

The invention consists essentially of the novel features pointed out broadly and specifically in the claims for novelty following a description containing an explanation in detail of an acceptable form of the invention.

The objects of the invention are to ensure a positive grip on pavement or hard roads, especially when covered with ice or snow, thereby preventing skidding and accidents and loss of time when driving on icy roads or pavements; to reduce the nerve strain when driving on slippery or icy roads or pavements; to prevent loss of time in the transportation of goods by means of motor vehicles, especially when the condition of the roads is such that ordinary non-skid chains and the like do not afford the proper traction; to construct an anti-skid device that may be readily attached to the ordinary tire chain or to the rim of the wheel; to construct such an anti-skid device in which the different parts may be readily replaced or sharpened and that will not cause excessive chafing or wearing on the tires and clogging with snow and the like; and generally to provide a device of this description, economical of manufacture and capable of accomplishing the aforesaid results and purposes.

In the drawings, Figure 1 is a side elevational view of the invention.

Like numerals of reference indicate corresponding parts in the various figures.

Figure 1:
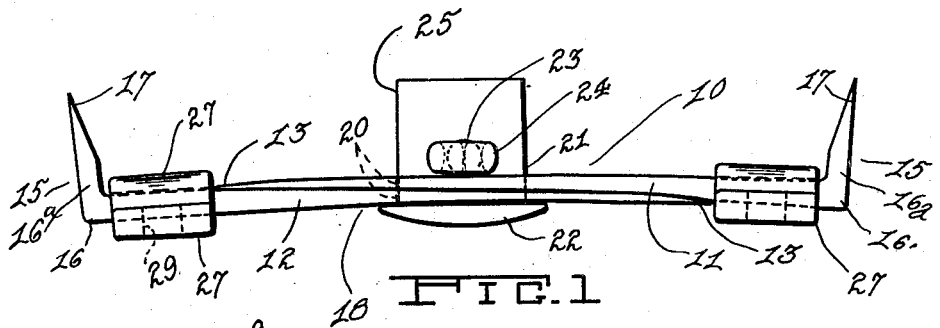
Figure 5:
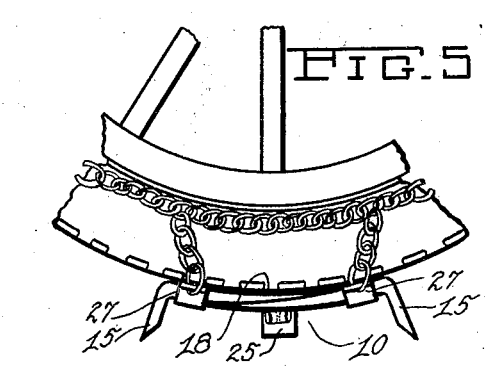
Figure 5 is a side elevational view showing one method of installation.

Referring to the drawings, the numeral 10 indicates the device complete. 11 and 12 are two flat metal bars tapered to one end as at 13. A caulk 15 is formed on each of the bars 11 and 12 at the ends opposite the tapered portion 13 by bending said bars as at 16 so that the portions 16A beyond the bends 16 lie substantially normal to the main body of the bars 11 and 12. The caulks 15 formed thereby extend a suitable distance, say from one half to one inch, more or less, according to the size of the tire for which the device is intended. The caulks 15 are sharpened as at 17 to allow them to penetrate ice or the like, thereby affording a positive traction on slippery surfaces. The bars 11 and 12 are slightly curved throughout their length as at 18 to allow a proper bearing on the periphery of the tire, as best shown in Figure 5, and are adapted to bear on or overlap each other, as illustrated in Figure 1, in such a manner that the tapered ends 13 will be spaced a short distance from the caulks 15. Each of the bars 11 and 12 are tapered throughout the overlapped portions so that the total thickness of the two bars at the overlap is approximately the thickness of the remaining portion of said bars 11 and 12.

A rectangular opening 20 is formed in each of said bars 11 and 12 and along the longitudinal axis thereof and so situated that when the bars 11 and 12 are overlapped, said openings 20 will coincide and be spaced an equal distance from the caulks 15. A key 21 substantially rectangular in cross section and having the head 22 is adapted to be inserted through the openings 20 to lock the bars 11 and 12 in their overlapped position. The openings 20 are slightly larger than the key 21 so that the bars 11 and 12 will not be held too rigidly. An opening 23 is formed in the key 21, spaced from the head 22 a distance slightly greater than the thickness of the overlapped bars. A cotter key 24 or some other suitable locking pin may be inserted through the opening 23 and bent or riveted to retain the key 21 in its operative position and the bars 11 and 12 in place. The key 21 is extended beyond the opening 23 to form a caulk 25 at right angles to the caulks 15. The caulk 25 is sharpened at its extremity to allow for its penetrating ice or the like, and preferably extends beyond the bars 11 and 12 approximately the same distance as do the caulks 15.

Flat straps 27 having rectangular openings 28 therethrough of a slightly greater area than the cross sectional area of the bars 11 and 12 adjacent the caulks 15, are mounted at said openings 28 on respective bars 11 and 12 before assembling the device, and are positioned adjacent the caulks 15. The caulks 15 and the ends 13 prevent the straps from becoming displaced after the device is assembled. Holes 29 are formed at each end through the straps 27, to allow a chain or hook to be secured to said straps.

If desired, the straps 27 could be forged to or formed integral with the bars 11 and 12, but I find that this slightly reduces the flexibility of the device and causes wear on the tires at this point. The head 22 is made sufficiently large to provide a proper bearing on a tire and is rounded on its bearing surface on said tires to prevent excessive wear.

In the operation of this invention, the device may be secured to the ordinary tire chains by short lengths of chain connected at one end to the tire chains and at the other to the straps 27 at the openings 29. The device 10 is arranged on the tire in such a manner that the caulks 15 will be normal to the direction of travel of the vehicle and the caulks 25 will be in line with the wheel. The device of course is arranged on the face of the tire where it will have the best traction on the road. The caulks 15 being at right angles to the line of travel afford a positive traction while the caulks 25 prevent slewing or side sway on slippery surfaces. When the caulks 15 or 25 become dull or worn out, the device may be readily disassembled by removing the cotter 23 and the pin 21 and finally withdrawing the bars 11 or 12 from the straps 27.

In most cases it is found advisable to use a plurality of these anti-skid devices on each wheel and especially on the driving wheels. Suitable clips may be secured to the felloe or rim of the vehicle wheel and the anti-skid devices detachably secured by means of chains or the like to said clips instead of securing them to the tire chains if it is so desired.

Figure 2:
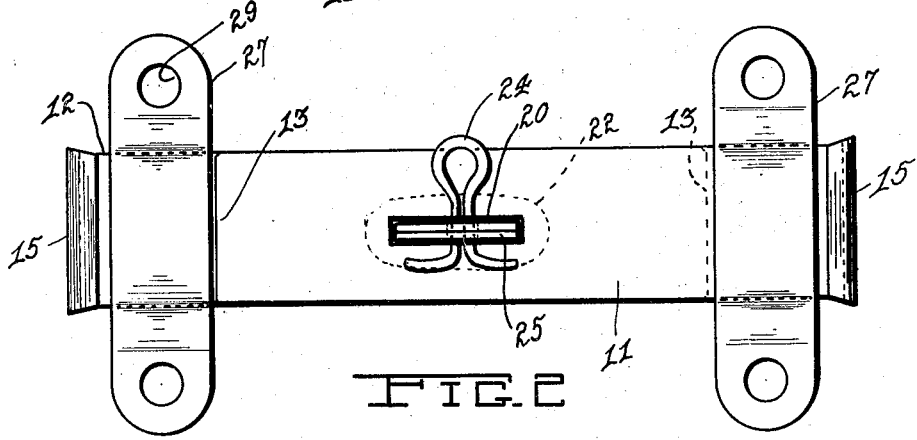
Figure 2 is a plan view of Figure 1.
Figure 3:
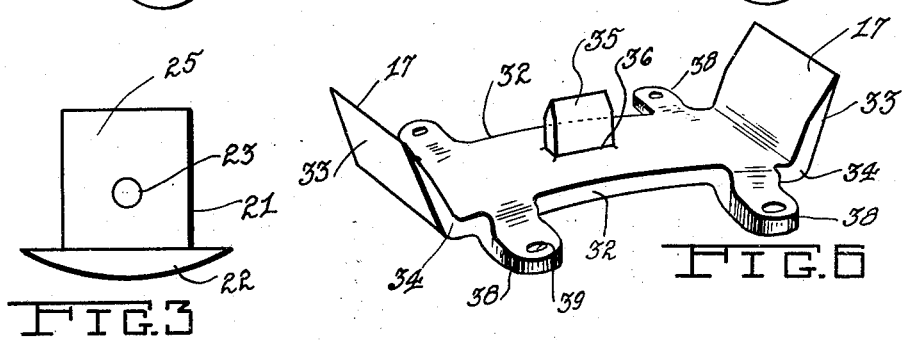
Figure 3 is an elevational view of a part of the the invention.
Figure 6:
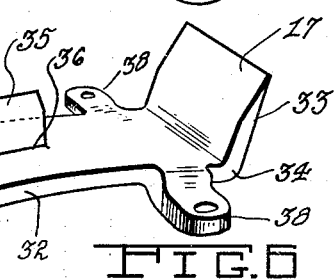
Figure 6 is a perspective view of a slightly modified form of this invention.
Figure 4:
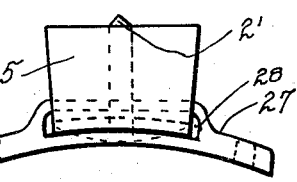
Figure 4 is an end elevational view of Figure 1.

In Figure 6, I show a slightly modified form of the invention. Instead of two separate bars 11 and 12 overlapping each other, I form the two bars integral, as at 32. The end caulks 33 are similar to the caulks 15 shown in Figure 1 and are formed by bending the bar 32 as at 34 adjacent each end to form said caulks or lugs 33. The caulks 33 are sharpened at the points as at 17 similar to those in the former case. A caulk 35, similar to the caulk 25 in the former case and similarly situated, may either be formed integral with the bar 32 as at 36 or secured to said bar through an opening similar to the opening 20 in Figure 2 by means of a cotter or locking pin. Extensions 38 are formed adjacent each end at each side of the bar 32 and have an opening 39 formed therethrough to allow for the securing of a fastening chain or clip thereto, similar to the clips 27.

It is to be noted that there are a great number of methods by which these devices might be secured to a wheel, such as by means of the usual tire chains, but it is not my purpose to claim such methods as being original and patentable as they are well known to the art. However, I believe that a device constructed substantially as shown is broadly novel and although the constructional details might be changed considerably, they would still fall within the scope of this invention as set forth and claimed in the following claims.

What I claim is:

1. In an anti-skid device, a plurality of traction members having caulks thereon forming gripping members, each of said traction members being formed of two bars having oppositely tapered overlapping faces and secured together by a central caulk passing through said bars and secured by a pin, and suitable brackets on said bars adapted to be engaged by chain lengths.

2. In an anti-skid device, a pair of bars forming traction members having caulks formed on their ends and oppositely tapering overlapping faces secured together centrally by a removable rectangular caulk passing through holes provided in said bars and secured therein by a pin, flat brackets encircling said bars at either end having a plurality of holes adapted to receive short lengths of chain extending radially from chains at either side of said traction members.

Signed at the city of Toronto, this 12th day of March, 1929.

THEODORE EMIL JOHNSON.